UNITED STATES PATENT OFFICE.

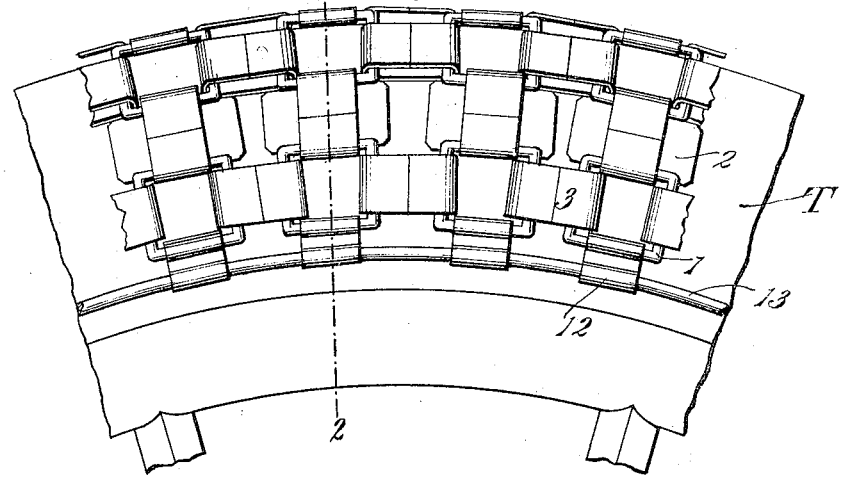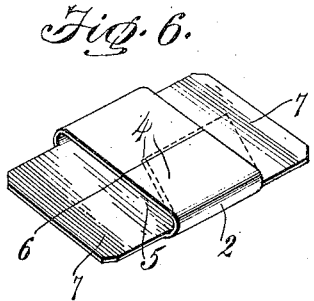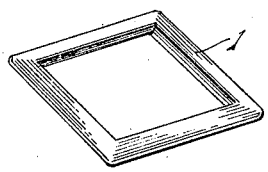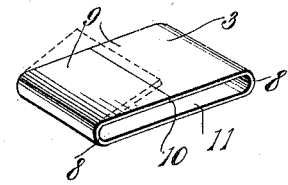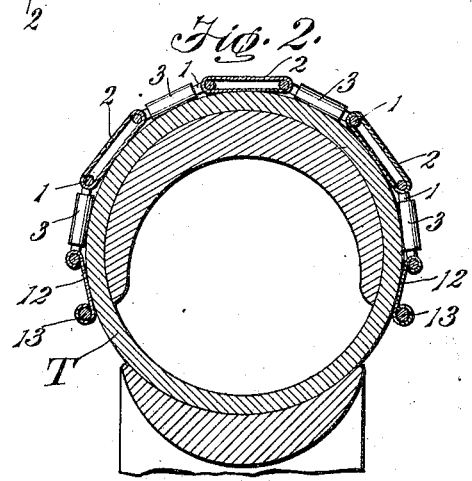

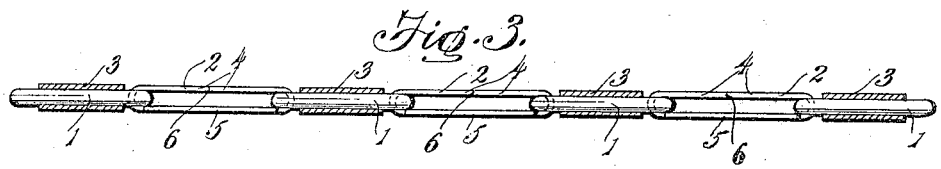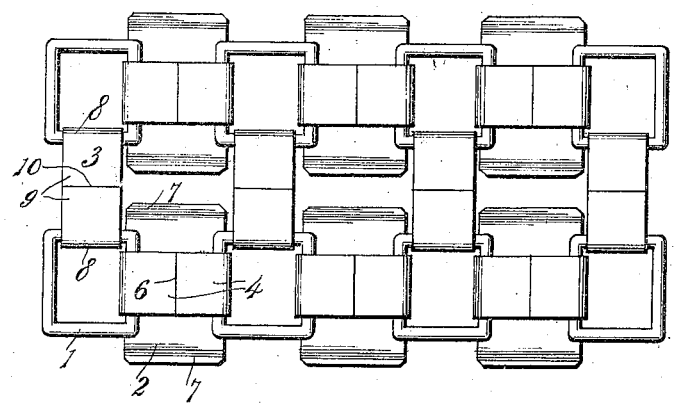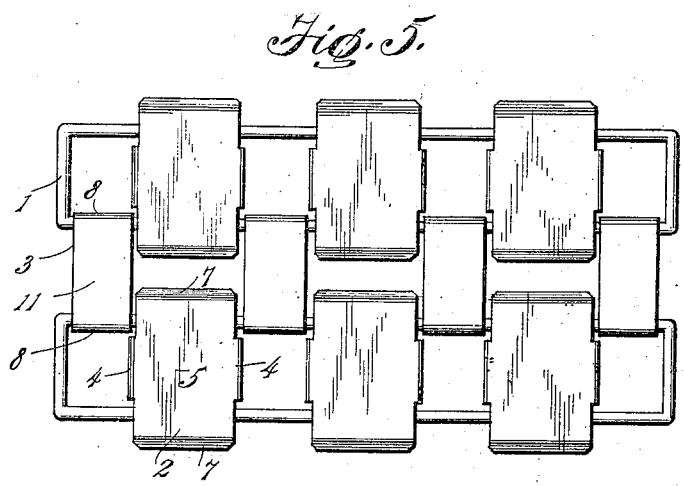

EDWARD J. WEIDNER, OF LINDSAY, NEBRASKA.

TIRE-PROTECTOR.

No. 922,739.

Specification of Letters Patent.

Patented May 25, 1909.

Application filed October 15, 1908. Serial No. 457,878.

*To all whom it may concern:*

Be it known that I, EDWARD J. WEIDNER, a citizen of the United States, residing at Lindsay, in the county of Platte and State of Nebraska, have invented certain new and useful Improvements in Tire-Protectors, of which the following is a specification, reference being had to the accompanying drawings.

This invention relates to improvements in tire protectors or guards and consists of the novel details of construction hereinafter described and claimed.

The object of the invention is to improve and simplify the construction of devices of this character and to provide one which will effectively protect the tire from wear incident to its use on rough roads, which will effectively prevent it from slipping on muddy roads and from skidding and which will reduce the liability of punctures and blow outs to a minimum.

In the drawings Figure 1 is a side elevation of a portion of a wheel and tire illustrating the application of the invention thereto; Fig. 2 is a transverse section taken on the plane indicated by the line 2—2 in Fig. 1; Fig. 3 is a detail longitudinal section through the protector; Figs. 4 and 5 are detail plan views of the outer and inner faces of the protector; and Figs. 6, 7 and 8 are detail perspective views of the several links from which the protector is made.

The protector is in the form of a net work composed of three different kinds of links designated, respectively, by the numerals 1, 2, 3. The links 1 are rectangular in shape and have the edges of their four side bars rounded, as illustrated. Said links 1 are arranged in transverse rows and are united by the links 2 which are interposed between them. Each of the links 2 is formed from an X-shaped piece of sheet metal, two of the opposite arms 4 of which are adapted to be bent over upon its central rectangular body portion 5 to produce the link proper. Said arms or ends 4 extend transversely of the net work of the protector and are passed through two adjacent links 1 to flexibly unite the same, the extremities of said arms or ends 4 being brought into contact with each other, as shown at 6, so that the links cannot become separated. The opposing side bars of the adjacent links 1 rest upon the body portions 5 of the transverse connecting links 2 and also to a slight extent upon the longitudinally extending arms or ends 7 of the links 2, as shown more clearly in Figs. 4 and 5 of the drawings, so that the bottom face of the net work of the protector, which face engages the tire, will be smooth to prevent possible injury to the latter. The transverse rows of rectangular links 1 are united to each other by the links 3, each of which latter is composed of a strip of sheet metal bent upon itself at suitable distances from its ends, as shown at 8, and having its ends or arms 9 passed through the opposing links 1 in two transverse rows and brought together, as shown at 10, so as to close the link 3 and prevent any possibility of the links of the net becoming separated. The closed sides 11 of the links 3 are disposed upon the bottom face of the net work so as to co-act with the flat or smooth body portions 5 of the links 2 in providing the net work with a smooth bottom face to contact the tire and prevent the protector from cutting or wearing the latter. This arrangement of the links, therefore, provides a comparatively smooth bottom surface for the net work, as will be seen upon reference to Fig. 5 of the drawings and at the same time it produces a roughened upper or outer surface, as shown in Fig. 4, so that the protector will take a firm grip upon the road and prevent the wheel from slipping in mud and from skidding on slippery surfaces. The arrangement of the protector over the tread and side portions of the tire T, as shown in Figs. 1 and 2, insures the latter from being worn and torn by rough roads and the ruts in the roads. The protector will also, to a large extent, prevent the tire from being punctured.

While any suitable means may be provided for retaining the protector upon the tire, I preferably attach supplemental links 12 to the endmost links of the transverse rows of rectangular links 1 and pass annular wires 13 through the links 12. The ends of the wires 13 may be connected in any suitable manner.

Having thus described the invention what is claimed is:

The hereindescribed pneumatic tire protector comprising a net work composed of transverse rows of rectangular links, X-shaped connecting links having their oppositely projecting broad ends or arms extending longitudinally and their narrow ends or arms bent over upon the flat body portions of the links and around the longitudinally extending portions of the adjacent rectangular links, said transverse ends or arms having their extremities brought together to prevent the disengagement of the rectangular links from the X-shaped connecting links and to
5 cause the longitudinally extending portions of the rectangular links to lie upon the body portions and longitudinal ends or arms of the X-shaped links, flat links connecting the transverse portions of the rectangular links
10 of adjacent transverse rows, said flat links being formed by bending the ends of metal strips upon themselves and bringing their extremities together to prevent them from becoming disengaged from the rectangular links and means for securing the net work 15 upon a tire.

In testimony whereof I hereunto affix my signature in the presence of two witnesses.

EDWARD J. WEIDNER.

Witnesses:
HENRY SCHACHER,
M. J. LAMARKEIR.